United States Patent [19]

Cheffer

[11] Patent Number: 4,488,058

[45] Date of Patent: Dec. 11, 1984

[54] SNUBBER CIRCUIT FOR USE IN AN UNINTERRUPTIBLE POWER SUPPLY

[75] Inventor: Harold H. Cheffer, Longwood, Fla.

[73] Assignee: NCR Corporation, Dayton, Ohio

[21] Appl. No.: 525,370

[22] Filed: Aug. 22, 1983

[51] Int. Cl.³ .......................... H02J 9/00; H02M 7/12
[52] U.S. Cl. ...................................... 307/66; 307/131; 307/584; 363/56
[58] Field of Search ....................... 307/44, 45, 46, 48, 307/64, 66, 130, 131, 584; 363/56-58

[56] References Cited

U.S. PATENT DOCUMENTS

| | | | |
|---|---|---|---|
| 4,058,758 | 11/1977 | Peterson | 363/56 X |
| 4,079,443 | 3/1978 | Udvardi-Lakoo et al. | 307/66 X |
| 4,400,625 | 8/1983 | Hussey | 307/66 |
| 4,438,356 | 3/1984 | Fleischer | 307/571 |
| 4,438,486 | 3/1984 | Ferraro | 363/56 |

Primary Examiner—A. D. Pellinen
Assistant Examiner—Derek S. Jennings
Attorney, Agent, or Firm—J. T. Cavender; Wilbert Hawk, Jr.; Richard W. Lavin

[57] ABSTRACT

A circuit for eliminating current transients in a switching circuit of an uninterruptible power supply having a main source of AC signals and an inverter for supplying AC signals from a DC source including gating device operated in response to receiving signals representing the failure of the main source of AC signals and the occurrence of a current transient in the AC output of the inverter. Operation of the gating device enables high frequency clock signals to synchronously energize a MOSFET which applies the AC output signals over the inverter to a load dissipating the current transients. The circuit includes a transformer operated by the high frequency clock signals to switch the MOSFET at a high frequency enabling the current transients to be eliminated in a minimum amount of time.

14 Claims, 7 Drawing Figures

SNUBBER CIRCUIT FOR USE IN AN UNINTERRUPTIBLE POWER SUPPLY

CROSS-REFERENCE TO RELATED APPLICATIONS

Phase Synchronization Circuit, co-pending application, Ser. No. 06/525,369, filed on Aug. 22, 1983, invented by Paul M. Rhoads and Harold H. Cheffer, assigned to the NCR Corporation.

Power MOSFET Transfer Switch, co-pending application, Ser. No. 06/525,209, filed on Aug. 22, 1983, invented by Harold H. Cheffer, assigned to the NCR Corporation.

High Frequency Inverter, co-pending application, Ser. No. 06/525,371, filed on Aug. 22, 1983, invented by Harold H. Cheffer, assigned to the NCR Corporation.

BACKGROUND OF THE INVENTION

1. Field of the Invention

The present invention is directed to uninterruptible power supplies and more particularly to a high speed reactive load power snubber circuit for dissipating current transients upon switching of an inverter to transfer alternating current from a load to a storage device of direct current upon the failure of the normal alternating current power line feeding such load.

2. Description of the Prior Art

In today's wide use of computers, data processors, controllers, etc. in data processing systems, it is extremely critical that the system be supplied with continuous power during its operation. Due to inadequate capacity and increasing load demands, commercially-supplied power is often subject to complete failure of the power signals or a reduction in the magnitude of the available voltage during peak demand periods. In cases where various customers subject the power system to sudden electrical loads, transients are generated in the system affecting the magnitude and phase of the supplied power signal.

Since the storage of data in a computer system is predicated on the continuous operation of the computer, power interruptions can adversely affect the integrity of the stored data. When the power drops abruptly, the computer will terminate operation probably with a high possibility of component damage. In order to overcome this situation, computers operating in a data processing system environment have been supplied with uninterruptible power supplies where the primary commercial power source and the reserve power source are connected in parallel. The power supply includes a commercial A.C. line power source and a D.C. voltage energized inverter power source connected in parallel to a switching mechanism which alternately couples one or the other of the two power supplies to the load to be energized. This power supply design provides a substantially uninterruptible power to the load. However, when an inductor load such as a motor is on the line, large current transients are developed upon the starting of the motor. Unless these current transients are dissipated quickly, they can reach a level which can destroy the solid state elements in the power supply. Where the inverter power source is supplying the power, prior power supplies have used silicon controlled rectifiers and large resistor loads to dissipate these current transients. The disadvantage of this type of arrangement is the slow response time of the rectifier in addition to the high cost of the resistor elements.

It is therefore a principal object of this invention to provide a circuit for use in an uninterruptible power supply which will dissipate current transients occurring in an A.C. power signal.

It is another object of this invention to provide a circuit for dissipating a current transient occurring in an A.C. power signal at a high rate of speed.

It is a further object of this invention to provide a circuit for dissipating a current surge in an A.C. power signal for use in an uninterruptible power circuit which is simple in construction and low in cost.

SUMMARY OF THE INVENTION

These and other objects of the invention are accomplished by providing a circuit associated with an inverter of an uninterruptible power supply for supplying an A.C. power signal from a D.C. source which includes a metal-oxide semiconductor field-effect transistor (MOSFET) whose gate electrode is connected through a transformer to a control circuit which receives a plurality of control signals including high frequency clock signals, a power failure signal, a signal indicating the presence of a current transient in the output of the inverter and a signal indicating the operating condition of the inverter. Upon sensing the occurrence of a power failure and the presence of a current transition, the control circuit will enable the high frequency clock signals to switch the transistor at a high rate of speed to apply the A.C. output of the inverter through the load until the current transient is dissipated.

BRIEF DESCRIPTION OF THE DRAWINGS

FIGS. 3A–3E inclusive disclose waveforms of the output signals associated with the operation of the snubber circuit.

DESCRIPTION OF THE PREFERRED EMBODIMENT

Figure 1:
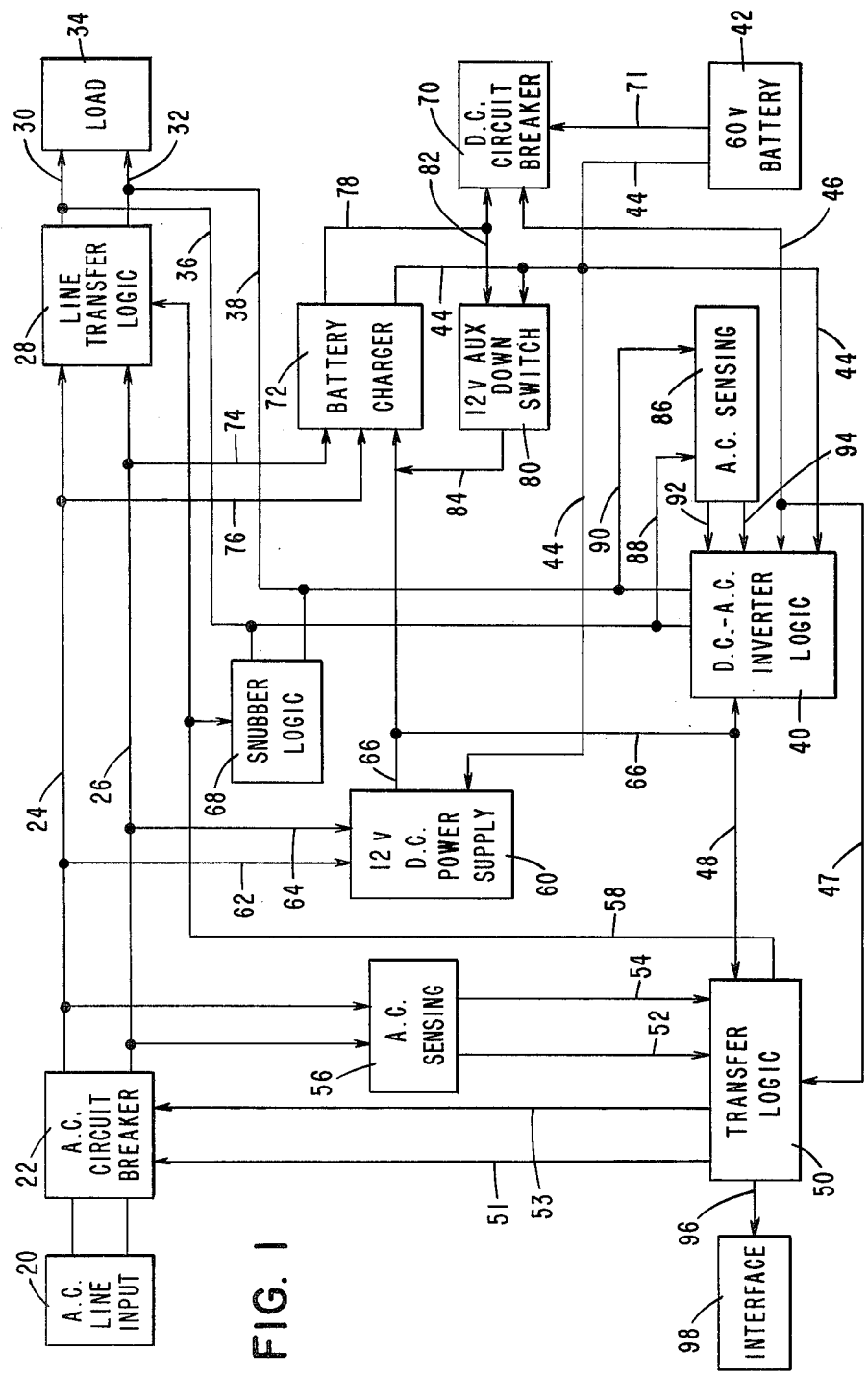
FIG. 1 is a block diagram of the uninterruptible power supply in which the snubber circuit of the present invention is utilized.

Referring now to FIG. 1, there is shown a block diagram of the uninterruptible power supply in which the snubber circuit of the present invention is found. Included in the power supply is the A.C. line input circuit 20 over which appears the A.C. power signals supplied from a commercial power source and which are transmitted through an A.C. circuit breaker 22 and over lines 24, 26 to a line transfer logic circuit 28 which controls the switching of the power source between an inverter and the commercial power source. The line transfer logic circuit 28 will output over lines 30, 32 to the load 34 an A.C. signal received over lines 24, 26 from the A.C. line input circuit 20. The load 34 also receives an A.C. signal transmitted over lines 36, 38 from a D.C. to A.C. inverter logic circuit 40 which, when enabled, will convert the D.C. signal output of a 60 volt battery 42 received over the common ground line 44 and line 46 to an A.C. signal. The inverter logic circuit is enabled by signals appearing on bus 48 when generated by a transfer logic circuit 50 which receives signals over lines 52, 54 from an A.C. sensing circuit 56 representing the signal level of the A.C. signals being outputted from the A.C. circuit breaker 22. The transfer logic circuit 50, upon sensing a drop in the signal level of the A.C. signal, will output control signals over bus 48 to the inverter logic circuit 40 and bus 58 to the line transfer logic circuit 28 enabling the inverter logic circuit 40 to output A.C. power signals over lines 36, 38 to the load 34 through lines 30 and 32. When the A.C. line input 20 returns to its normal power level, the transfer logic circuit 50 will enable the line transfer logic circuit 28 to switch back to the input lines 24, 26 allowing the A.C. line input circuit 20 to supply the power over lines 36 and 38 to the load 34. This switching of the line input circuit 20 occurs in phase with the original line frequency of the signals appearing at the line input circuit 20. The transfer logic circuit 50 outputs over lines 51, 53 signals for disabling the A.C. circuit breaker circuit 22 when a system overload occurs. The circuit 50 also outputs signals over line 96 to an interface circuit 98 indicating the operating condition of the power supply.

Further included in the power supply is a 12 volt D.C. power supply 60 which receives the A.C. power signals over lines 62 and 64 and converts them to a 12 volt D.C. signal which is supplied over line 66 to power the various logic circuits in the power supply. Also included in the power supply is the snubber logic circuit 68 of the present invention which eliminates any abnormal current spikes which occur during the switching of the transfer logic circuit 28 between the A.C. line input circuit and the inverter logic circuit 40 in a manner that will be described more fully hereinafter. The circuit 68 receives control signals over bus 58 from the transfer logic circuit 50 and from the inverter logic circuit 40. Associated with the 60 volt battery 42 is a D.C. circuit breaker 70 connected to the battery 42 over line 71 and providing a current overload protection for the battery, a battery charging circuit 72 which converts the A.C. line signals appearing on lines 74, 76 to a charging current which is then supplied to the battery 42 over line 78 during the time the A.C. line power signals are available and a 12 volt auxiliary down switch 80 which supplies a 12 volt D.C. signal to power the logic circuits upon the failure of the A.C. line input. The switch 80 drops the 60 volt signal supplied over line 82 from the battery 42 through the circuit breaker 70 and outputs the 12 volt D.C. signal over lines 84 and 66 to the required logic circuits of the power supply.

Associated with the inverter logic circuit 40 is an A.C. sensing circuit 86 receiving over lines 88, 90 the A.C. signal output of the inverter logic circuit 40, the amplitude of such signals being used to regulate the amplitude and shape of the A.C. signals outputted by the logic circuit 40. The sensing circuit 86 drops the A.C. output signal level appearing on lines 92, 94 to 5 volts, allowing the signal to be compared with the signals being outputted by the logic circuit 40.

Figure 2:
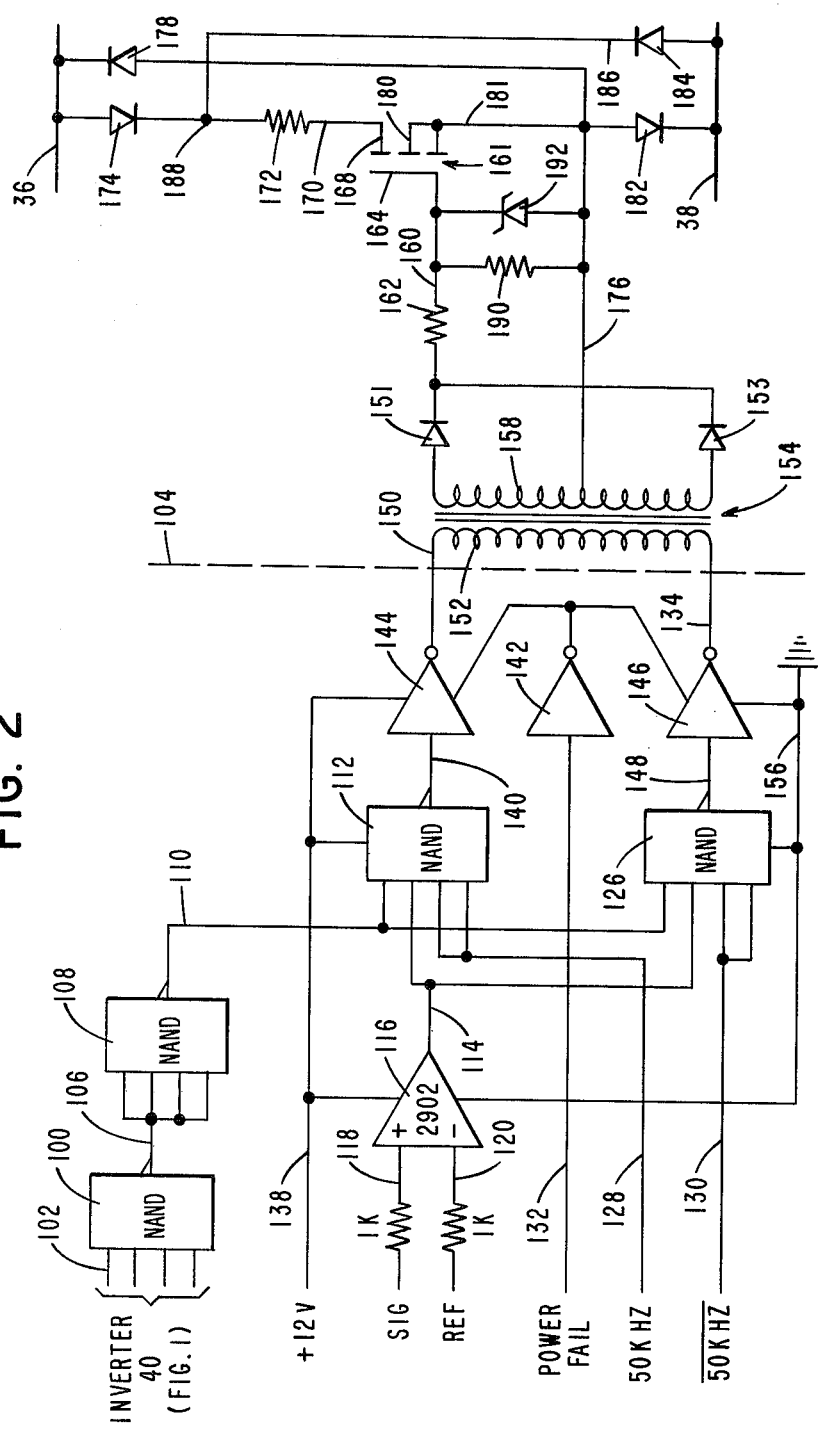
FIG. 2 is a schematic representation of the snubber circuit of the present invention.

Referring now to FIG. 2, there is shown details of the snubber logic circuit 68 (FIG. 1) which includes a NAND gate 100 receiving over lines 102 of the bus 48 (FIG. 1) signals representing the condition of a pair of power MOSFETS (not shown) located in the inverter logic circuit 40. The MOSFETS are cycled to chop D.C. current supplied from the 60 volt battery 42 (FIG. 1) to provide the A.C. power signals outputted by the inverter logic circuit 40. In the circuit disclosed in FIG. 2, that portion of the circuit to the right of the dotted line 104 is located in the snubber logic circuit 68 (FIG. 1) with the remaining portion of the circuit left of the dotted line being located in the transfer logic circuit 50. For a complete description of the inverter logic circuit 40, reference should be made to the previously cited co-pending application of Cheffer, Ser. No. 525,331, which application is fully incorporated herein by reference. For a complete description of the transfer logic circuit, reference should be made to the previously cited co-pending application of Rhoads et al., Ser. No. 525,369, which application is fully incorporated herein by reference.

The signals appearing on lines 102 which are part of bus 48 (FIG. 1) indicate the operating condition of the inverter logic circuit 40. The snubber circuit of FIG. 2 is enabled for operation only when the MOSFETS of the inverter logic circuit 40 are off during their operating cycle. This sequence ensures that the snubber circuit will not short out the inverter logic circuit at the time the inverter is supplying current to the load 34 (FIG. 1). The output signal of gate 100 is transmitted over line 106 to a NAND gate 108 whose output signal is transmitted over line 110 to a NAND gate 112.

Figure 3A:
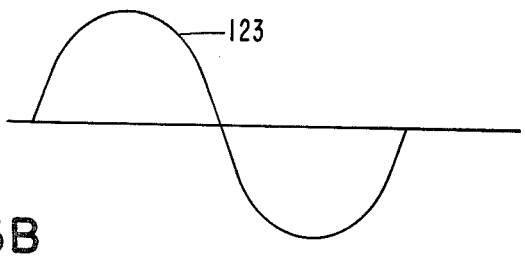
Figure 3B:
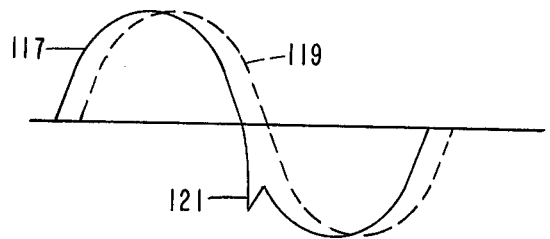

The NAND gate 112 also receives a signal over line 114 from a comparator circuit comprising a 2902 operational amplifier 116 which compares a signal SIG representing the amplitude of the A.C. power signal 117 (FIG. 3B) being outputted by the A.C. sensing circuit 86 (FIG. 1) and which is received from the inverter logic circuit 40 over line 118 of the bus 48. As shown in FIG. 3B, when an A.C. power signal is supplied to an inductive load such as a motor, the current waveform 119 lags the voltage waveform 117. When the voltage waveform is switching from a positive to the negative portion of the waveform or vice versa, the current is still positive and in an inverter circuit will produce a spike 121 in the voltage waveform. The snubber circuit 68 is operated to dissipate the current to eliminate the spike whenever it occurs. As part of this operation, the amplifier 116 compares the signal level of the signal SIG received over line 118 with a reference signal 123 (FIG. 3A) designated as REF (FIG. 2) representing the required amplitude for the A.C. power signal being outputted by the inverter logic circuit 40 (FIG. 1). This signal is received over line 120. Whenever the amplitude of the signal SIG exceeds the signal REF, the amplifier 116 will output a high signal to the NAND gates 112 and 126. For a complete description of the circuits for generating the signals SIG, REF, reference should be made to the previously-cited co-pending application, Ser. No. 525,331.

Figure 3C:
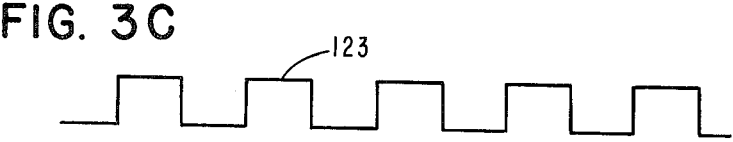

The NAND gates 112 and 126 further receive 50 KHz. timing signals 123 (FIG. 3C) over lines 128 and 130 generated by an oscillator (not shown) located in the transfer logic circuit 50 (FIG. 1). The output signals of the NAND gates 112 and 126 are outputted over line 140 and 148 to inverter driver circuits 144 and 146 which are controlled by the output signal of a line driver enable circuit 142. The output signals of the driver circuits 144 and 146 are transmitted over lines 150 and 134 of bus 58 (FIG. 1) to one side of the primary windings 152 of a transformer generally indicated by the numeral 154. The transformer 154 also includes secondary windings 158 connected through rectifying diodes 151, 153 and resistor 162 over line 160 to the gate terminal 164 of a metal-oxide semiconductor field-effect transistor (MOSFET) generally indicated by the numeral 161. The MOSFET 161 further includes a drain terminal 168 connected over line 170 through a dropping resistor 172 to the cathode end of a diode 174 whose anode is connected to the output line 36 of the inverter logic circuit 40 (FIG. 1) over which the A.C. power signals are transmitted to the load 34.

A center tap of the secondary windings 158 of the transformer 154 is connected through line 176 to the source terminal 180 of MOSFET 161. The MOSFET 161 further includes a source terminal 180 connected over line 181 to the anode end of a diode 182 whose cathode end is connected to the output line 38 (FIG. 1) of the inverter logic circuit 40. The line 38 is also connected to the drain terminal 168 of the MOSFET 161 through a diode 184, line 186, node 188, line and the resistor 172. A resistor 190 shunted across the center tap portion of the secondary windings 158 of the transformer 154 forms a voltage divider circuit with resistor 162. Also shunted across the windings 158 is a back-to-back zener diode 192 for limiting the voltage applied to the gate terminal 164 of the MOSFET 161.

In the operation of the circuit shown in FIG. 2, upon an occurrence of a power failure in the A.C. supply, the line transfer logic circuit 28 (FIG. 1) is turned off disabling the A.C. line input circuit 20 and enabling the inverter logic circuit 40 to supply the A.C. power signals over lines 36, 38 to the load 34. At this time, the line driver enable circuit 142 (FIG. 2) receives over line 132 the signal POWER FAIL which goes low upon the amplitude of the A.C. signal appearing at the A.C. line input circuit 20 (FIG. 1) going below a predetermined level. In response to receiving the low signal, the driver 142 will output a high signal enabling the operation of the driver circuits 144 and 146. This sensing of the A.C. line input circuit 20 is accomplished by the A.C. sensing circuit 56 (FIG. 1) comprising a transformer (not shown) and whose output signals are transmitted over lines 52, 54 to the transfer logic circuit 50 (FIG. 1). Reference should be made to the previously-cited copending application of Rhoads et al., Ser. No. 525,369, for a description of the comparator circuits which generate the signal POWER FAIL.

The output signal of the NAND gate 108 will cycle between a high and low signal corresponding to the cycling of the power MOSFETS in the inverter logic circuit 40 (FIG. 1). If at this time the amplitude of the A.C. output signal 117 (FIG. 3B) of the inverter logic circuit 40 exceeds the reference signal 123 (FIG. 3A), the amplifier 116 will output a high signal over line 114 to the NAND gates 112 and 126. As the 50 KHz. clock signals appearing on lines 128 and 131 go high, the NAND gates 112 and 126 will output a corresponding high signal over lines 140 and 148 allowing the drivers 144 and 146 to output the corresponding clock signals which drive the transformer 154 to output corresponding control pulses over line 160 to the gate terminal 164 of the transistor 161, thereby cycling the transistor at a 50 KHz. rate. When the transistor 161 is turned on, the current path during the positive-going portion of the A.C. waveform is from line 38, through diode 182, the MOSFET 161, resistor 172, diode 174 and line 36 through the load 34 (FIG. 1) and back through line 38. During the negative-going portion of the A.C. waveform, the current path is from line 36, through diodes 178, resistor 172, MOSFET 161, diode 184 to line 38, load 34 (FIG. 1) and back through line 36. It will thus be seen that the MOSFET 161 is cycled at a very high frequency rate during which time the current transients of the A.C. signal will be dissipated through the resistor 172 and the MOSFET 161. Once the amplitude of the A.C. signal falls below the amplitude of the signal REF, the amplifier 116 will output a low signal, thereby disabling the NAND gate 112 which in turn shuts off the operation of the transformer 154 and the MOSFET 161 enabling the A.C. output signal of the inverter logic circuit 40 (FIG. 1) to be transmitted over lines 36, 38 to the load 34.

The integrated circuit elements disclosed herein are commercially available from the National Semiconductor Corporation of Mountain View, Calif.

Numerous modifications and adaptations of the system of the present invention will be apparent to those skilled in the art, and thus it is intended by the appended claims to cover all such modifications and adaptations which fall within the true spirit and scope of this invention.

I claim:

1. In an uninterruptible power supply which includes a first source of AC signals and a second source of AC signals, a circuit for regulating the switching of the first and second source of AC signals to the load including:

means for generating a first control signal upon sensing the occurrence of a current transient in the output of the second source of AC signals;

a source of second control signals generated in response to the failure of the first source of AC signals to supply said AC signals;

switching means for connecting the second source of AC signals to the load when enabled;

a source of high frequency clock signals;

and gate means enabled upon the simultaneous occurrence of said first and second control signals to output said clock signals to said switching means whereby said switching means is operated to cyclically connect said second source of AC signals to the load until the current transient is eliminated.

2. The circuit of claim 1 which further includes a source of third control signals generated in response to the AC signals of the second source being at zero voltage, said gate means connected to said source of third control signals for outputting said clock signals upon the simultaneous occurrence of said first, second and third control signals.

3. The circuit of claim 1 which further includes a transformer member connected to said gating means and said switching means and enabled by said clock signals to cyclically operate said switching means in accordance with the frequency of said clock signals.

4. The circuit of claim 3 in which said second source of AC signals is connected to the load over a two-conductor transmission line, said switching means being connected between said conductors to cyclically apply the AC signals from the second source to the load when enabled.

5. The circuit of claim 4 in which said switching means comprises a MOSFET having its drain electrode connected to one of the conductors and its source electrode connected to the other conductor, said power supply further including a plurality of unidirectional members connected between the conductors whereby the transistor transmits one portion of the AC signal applied to the conductors and the unidirectional members transmit the remaining portion of the AC signals enabling the AC signals to be cyclically applied to the load.

6. In an uninterruptible power supply for supplying AC signals to a load which includes a source of AC signals and an inverter for supplying AC signals from a DC source, a circuit for regulating switching current transient generated in switching the inverter to the load including:

logic circuit means for generating a first control signal upon sensing the occurrence of a current transient in the AC output of the inverter;

a source of second control signals generated in response to the failure of the source to supply AC signals to the load;

transistor means connected to the output of the inverter and the load for connecting the output of the inverter to the load when enabled;

a drive transformer connected to said transistor means for enabling said transistor means when operated;

a source of first and second high frequency clock signals;

and control means enabled upon the simultaneous occurrence of said first and second control signals to output the clock signals to said drive transformer to cyclically operate said drive transformer whereby said transistor is cyclically enabled to connect the output of the inverter to the load until the current transient is eliminated.

7. The circuit of claim 6 which further includes a source of third control signals generated at the time the inverter is not outputting an AC signal, said source of third control signals being connected to said control means whereby said control means outputs the clock signals to said transformer upon the simultaneous occurrence of said first, second and third control signals.

8. The circuit of claim 7 which further includes a two-wire transmission line interconnecting the inverter and the load, said transistor means being connected across said wires to cyclically apply the AC signals received from the inverter to the load when enabled.

9. The circuit of claim 8 in which said transistor means comprises a metal oxide semiconductor field effect transistor having its gate electrode connected to said transformer, its drain electrode connected to one of the transmission wires and its source electrode connected to the other wire of said transmission line, said power supply further including a plurality of first diodes connected between the wires of the transmission line and a plurality of second diodes connected between the wires of the transmission line in a direction opposite to said first diodes whereby the transistor will transmit one portion of the AC signal to the load and the first and second diodes transmitting the remaining portion of the AC signal to the load.

10. The circuit of claim 7 which further includes a source of reference AC signals and the output AC signals of the inverter, said logic circuit means includes a comparator receiving said reference AC signals and the output AC signals of the inverter for outputting said first control signal when the output of the AC signals exceeds the reference AC signals.

11. The circuit of claim 8 in which said control means includes a first NAND gate receiving said first clock signals and said first and third control signals, said control means further includes drive means connected to the output of said NAND gate and said transformer and enabled by said second control means for driving said transformer in response to receiving said first clock signals whereby said transistor means is enabled in accordance with the frequency rate of said clock signals.

12. The circuit of claim 11 in which the frequency rate of said clock signals is 50 KHz.

13. The circuit of claim 11 in which said drive means include a first drive circuit connected to the output of said NAND gate and said transformer for transmitting the output of said NAND gate to the transformer when enabled and a second drive circuit connected to said first drive circuit and the source of said second control signals for enabling said first drive circuit upon the generation of a second control signal.

14. The circuit of claim 13 in which said drive transformer includes primary windings having one end connected to said first drive circuit, said control means further includes a second NAND gate receiving said second clock signals and said first and third control signals for outputting said second clock signals upon the simultaneous occurrence of said first and third control signals, and a third drive circuit connected to the output of said second NAND gate and said primary windings and enabled by the operation of said second drive circuit to output said second clock signals to the transformer whereby the transistor means is enabled at the frequency rate of said first and second clock signals.

* * * * *